United States Patent
Kamiya et al.

(10) Patent No.: US 8,180,957 B2
(45) Date of Patent: May 15, 2012

(54) MEMORY CONTROL UNIT AND MEMORY CONTROL METHOD

(75) Inventors: Takashi Kamiya, Sendai (JP); Takayuki Tago, Yokohama (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 12/528,351

(22) PCT Filed: Mar. 13, 2007

(86) PCT No.: PCT/JP2007/054963
§ 371 (c)(1),
(2), (4) Date: Aug. 24, 2009

(87) PCT Pub. No.: WO2008/126172
PCT Pub. Date: Oct. 23, 2008

(65) Prior Publication Data
US 2010/0037015 A1    Feb. 11, 2010

(51) Int. Cl.
*G06F 13/00* (2006.01)
*G06F 13/28* (2006.01)

(52) U.S. Cl. .. 711/105; 711/154; 711/167; 711/E12.084

(58) Field of Classification Search ................ None
See application file for complete search history.

(56) References Cited

U.S. PATENT DOCUMENTS 5,715,476 A * 2/1998 Kundu et al. .......... 710/35
5,802,550 A   9/1998 Fullam

FOREIGN PATENT DOCUMENTS

| JP | 05-061761 A | 3/1993 |
| JP | 11-053252 A | 2/1999 |
| JP | 11-501751 T | 8/2009 |

* cited by examiner

*Primary Examiner* — Kevin Verbrugge
*Assistant Examiner* — Eric S Cardwell
(74) *Attorney, Agent, or Firm* — Seed IP Law Group PLLC

(57) ABSTRACT

An object of the invention is to provide a memory control unit and a memory control method capable of making the operation setting of SDRAM without intentionally stopping access to the SDRAM. A switch signal generation section (18) for generating a switch signal to switch the operation setting of SDRAM (200), a switch control section (16) for switching the operation setting of the SDRAM (200) using a switch setup value (17) as the switch signal is output from the switch signal generation section (18), and an access control section (14) for suppressing acceptance of an access request to the SDRAM (200) in the time period from the switch start time of the operation setting to the switch completion time are provided. Accordingly, when the operation setting of the SDRAM (200) is changed, it is not necessary to intentionally stop access to the SDRAM (200) and it is made possible to change the operation setting of the SDRAM (200) without being affected by the access situation to the SDRAM (200).

4 Claims, 5 Drawing Sheets

MEMORY CONTROL UNIT AND MEMORY CONTROL METHOD

TECHNICAL FIELD

This invention relates to a memory control unit and a memory control method for switching operation setting of SDRAM (Synchronous Dynamic Random Access Memory).

BACKGROUND ART

FIG. 5 is a block diagram to show the schematic configuration of a memory control unit for controlling SDRAM in a related art. In the figure, a memory control unit 100 is configured by a setting section 101 for retaining setup information to switch operation setting of SDRAM 200, a setting change detection section 102 for detecting a command signal from a bus master 300 indicating change of the setup information retained in the setting section 101, and a setting control section 103 for changing the setup information retained in the setting section 101 in accordance with the command signal detected by the setting change detection section 102. The memory control unit 100 generally is connected to a plurality of bus masters 300 and makes optimum operation setting for each bus master (for example, refer to patent document 1). Patent document 1: Japanese Patent Laid-Open No. 53252/1999

DISCLOSURE OF THE INVENTION

<Problems to be solved by the Invention>

However, in the conventional memory control unit, in order to change the operation setting of one bus master, it is necessary to program software for intentionally stopping access of the bus master to the SDRAM 200 and changing the operation setting.

In view of the circumstances, it is an object of the invention to provide a memory control unit and a memory control method capable of changing the operation setting of SDRAM without being affected by the access situation to the SDRAM by changing the operation setting of the SDRAM without intentionally stopping access to the SDRAM.
<Means For Solving The Problems>

A memory control unit of the invention include a switch control section for performing control to switch operation setting of SDRAM; a switch signal generation section for generating a switch signal to be supplied to the switch control section; and an access control section for accepting an access request to the SDRAM, wherein upon reception of the switch signal from the switch signal generation section, the switch control section switches the operation setting of the SDRAM, and wherein the access control section stops acceptance of the access request to the SDRAM in the time period from the switch start time to the completion time of the operation setting of the SDRAM by the switch control section.

According to the configuration, the switch signal generation section for generating a switch signal at any desired timing for the switch control section for switching the operation setting is included, so that when the operation setting of the SDRAM is changed, it is not necessary to intentionally stop access to the SDRAM.

The memory control unit of the invention has a plurality of switch setup values and the switch control section selects one of the plurality of switch setup values in accordance with switch information to specify the switch setup value and switches the operation setting of the SDRAM using the selected switch setup value.

According to the configuration, the memory control unit has a plurality of switch setup values to change the operation setting of the SDRAM, selects the switch setup value in accordance with the switch information, and switches the operation setting of the SDRAM using the selected switch setup value, so that the setup values can be easily switched.

A memory control method of the invention includes the steps of generating a switch signal to execute switch processing of operation setting of SDRAM and switching the operation setting of the SDRAM using a switch setup value as the switch signal is generated and stopping acceptance of the access request to the SDRAM in the time period from the switch start time of the operation setting of the SDRAM to the completion time.

According to this method, a switch signal is generated at any desired timing for processing of switching the operation setting, so that when the operation setting of the SDRAM is changed, it is not necessary to intentionally stop access to the SDRAM.
<Advantages Of The Invention>

In the invention, the memory control unit for making the operation setting of SDRAM can change the operation setting of the SDRAM without intentionally stopping access to the SDRAM.

Figure 1:
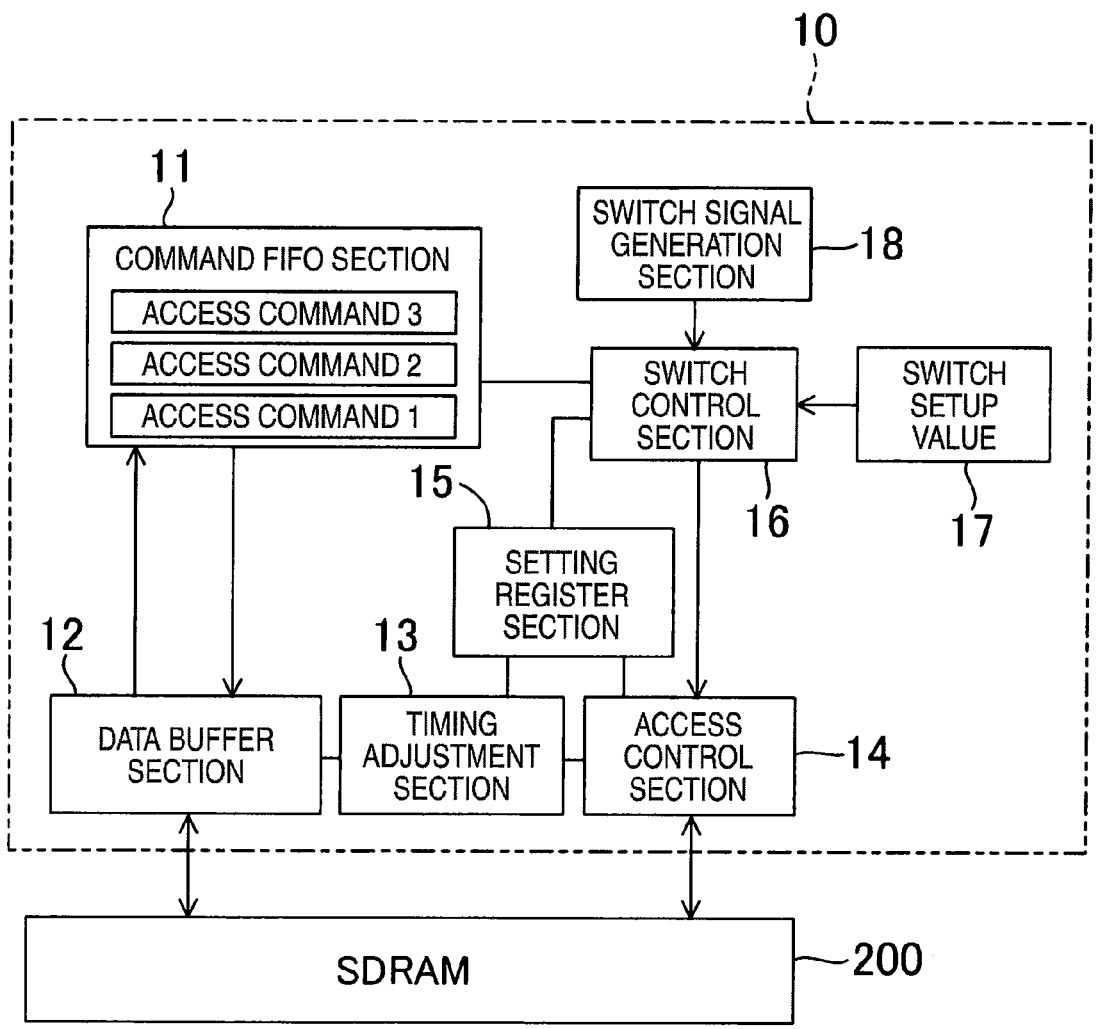
FIG. 1 is a block diagram to show the schematic configuration of a memory control unit according to embodiment 1 of the invention.

DESCRIPTION OF REFERENCE NUMERALS 10,10B Memory control unit
11 Command FIFO section
12 Data buffer section
13 Timing adjustment section
14 Access control section
15 Setting register section
16,16B Switch control section
17,24 Switch setup value
18 Switch signal generation section
19,23 Setup value change control section
20 Current setup information section
21 Switch information
22 Comparison section
200 SDRAM
<Best Mode For Carrying Out The Invention>

Preferred embodiments for carrying out the invention will be discussed in detail with reference to the accompanying drawings.

(Embodiment 1)

FIG. 1 is a block diagram to show the schematic configuration of a memory control unit according to embodiment 1 of the invention. In the figure, a memory control unit 10 of the embodiment is configured by a command FIFO (First In First Out) section 11 for storing an access command to SDRAM 200, a data buffer section 12 for transferring data to and from the SDRAM 200, an access control section 14 for controlling access to the SDRAM 200, a timing adjustment section 13 for setting the operation timings of the data buffer section 12 and the access control section 14, a setting register section 15 for determining the operation states of the timing adjustment section 13 and the access control section 14, a switch control section 16 for operating the access control section 14 and the setting register section, a switch setup value 17 used in the switch control section 16, and a switch signal generation section 18 for generating a switch signal to be given to the switch control section 16. The switch setup value 17 is previously stored in memory (not shown) in the memory control unit 10.

Figure 2:
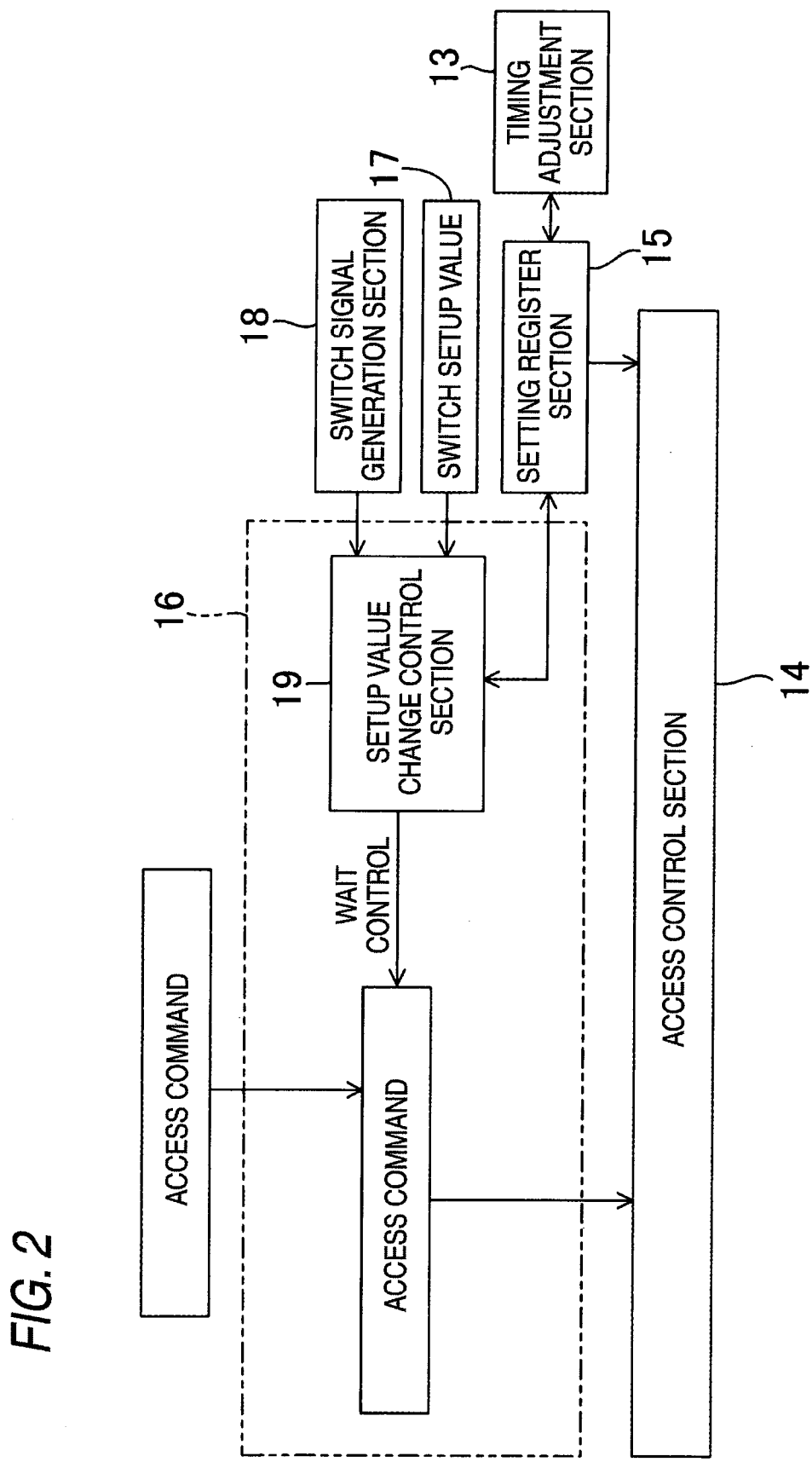
FIG. 2 is a block diagram to show the schematic configuration of a switch control section of the memory control unit according to embodiment 1 of the invention.

FIG. 2 is a block diagram to show the schematic configuration of the switch control section 16. In the figure, the switch control section 16 has a setup value change control section 19 for changing the setup value using the switch setup value 17 in accordance with a switch signal from the switch signal generation section 18 as a switch request. Upon reception of the switch signal from the switch signal generation section 18, the setup value change control section 19 changes the contents of the setting register section 15 using the switch setup value 17 in a state in which notification sent to the access control section 14 is stopped by performing wait control. When the change in the setting register section 15 is complete, the wait control is stopped. This control enables the setup value to be changed without intentionally stopping access to the SDRAM 200.

Figure 3:
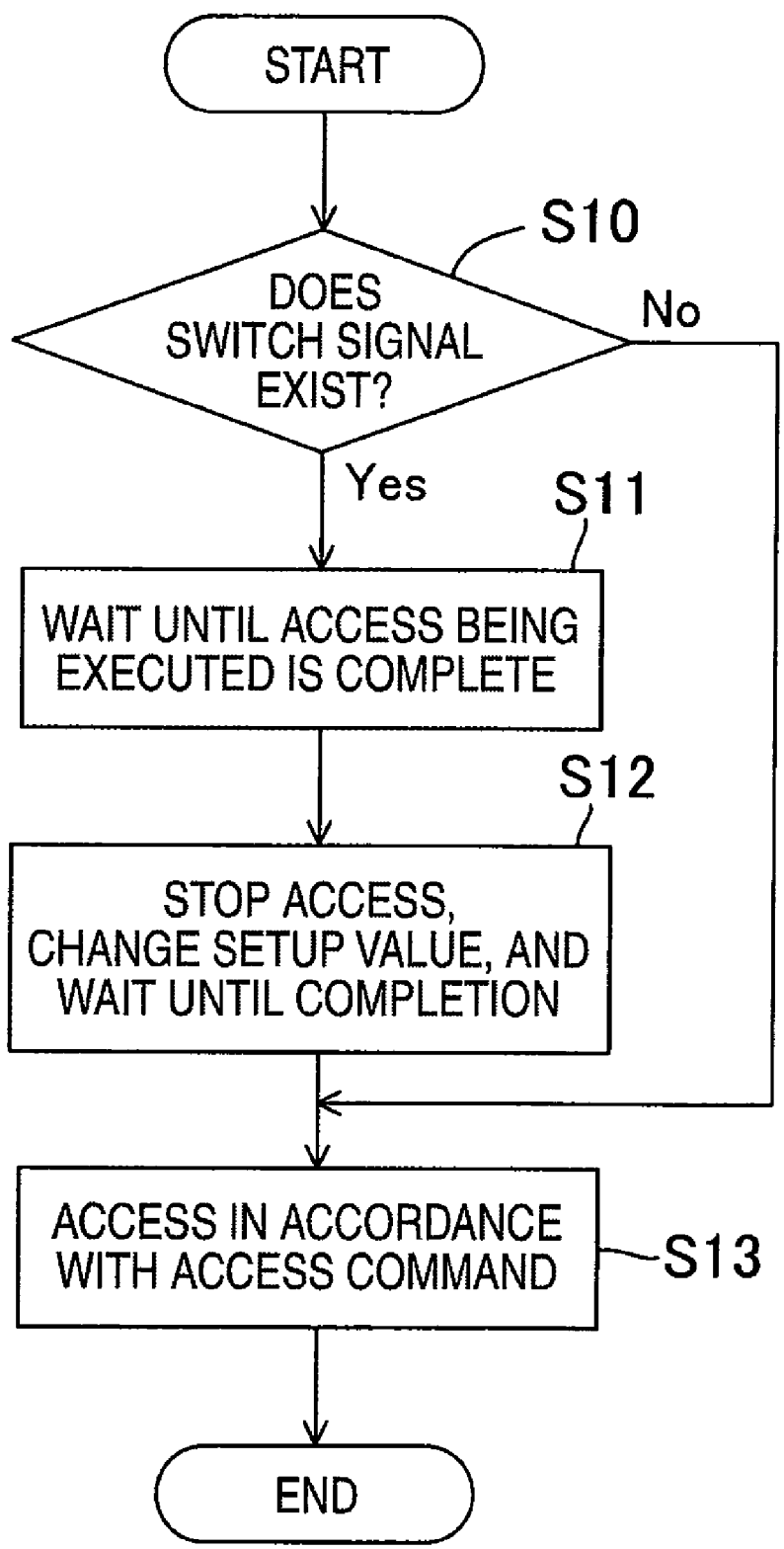
FIG. 3 is a flowchart to show the operation of the memory control unit according to embodiment 1 of the invention.

Next, the operation of the memory control unit 10 described above will be discussed. FIG. 3 is a flowchart to show the operation of the switch control section 16. In the figure, first, whether or not a switch signal exists is determined (step S10). That is, whether or not a switch signal has been output from the switch signal generation section 18 is determined. If a switch signal exists, the switch control section waits until the current access command being executed is complete (step S11). When the current access command being executed is complete, wait control is performed and execution of the next access command is stopped.

Next, the current setup value retained in the setting register section 15 is changed using the switch setup value 17 (step S12). That is, the current setup value is changed to the switch setup value 17. After the change of the setup value in the setting register section 15 is thus complete, the wait control for the command FIFO section 11 is canceled and execution of the command is restarted (step S13). The operation of the switch control section 16 is now complete. In parallel with the operation of the switch control section 16, the access control section 14 does not accept an access request to the SDRAM 200 in the time period from the switch start time of the operation setting of the SDRAM 200 by the switch control section 16 to the switch completion time.

Thus, the memory control unit 10 according to the embodiment includes the switch signal generation section 18 for generating a switch signal for switching the operation setting of the SDRAM 200, the switch control section 16 for switching the operation setting of the SDRAM 200 according to output of a switch signal from the switch signal generation section 18, and the access control section 14 for suppressing acceptance of an access request to the SDRAM 200 in the time period from the switch start time of the operation setting to the switch completion time, so that when the operation setting of the SDRAM 200 is changed, it is not necessary to intentionally stop access to the SDRAM 200.

(Embodiment 2)

Figure 4:
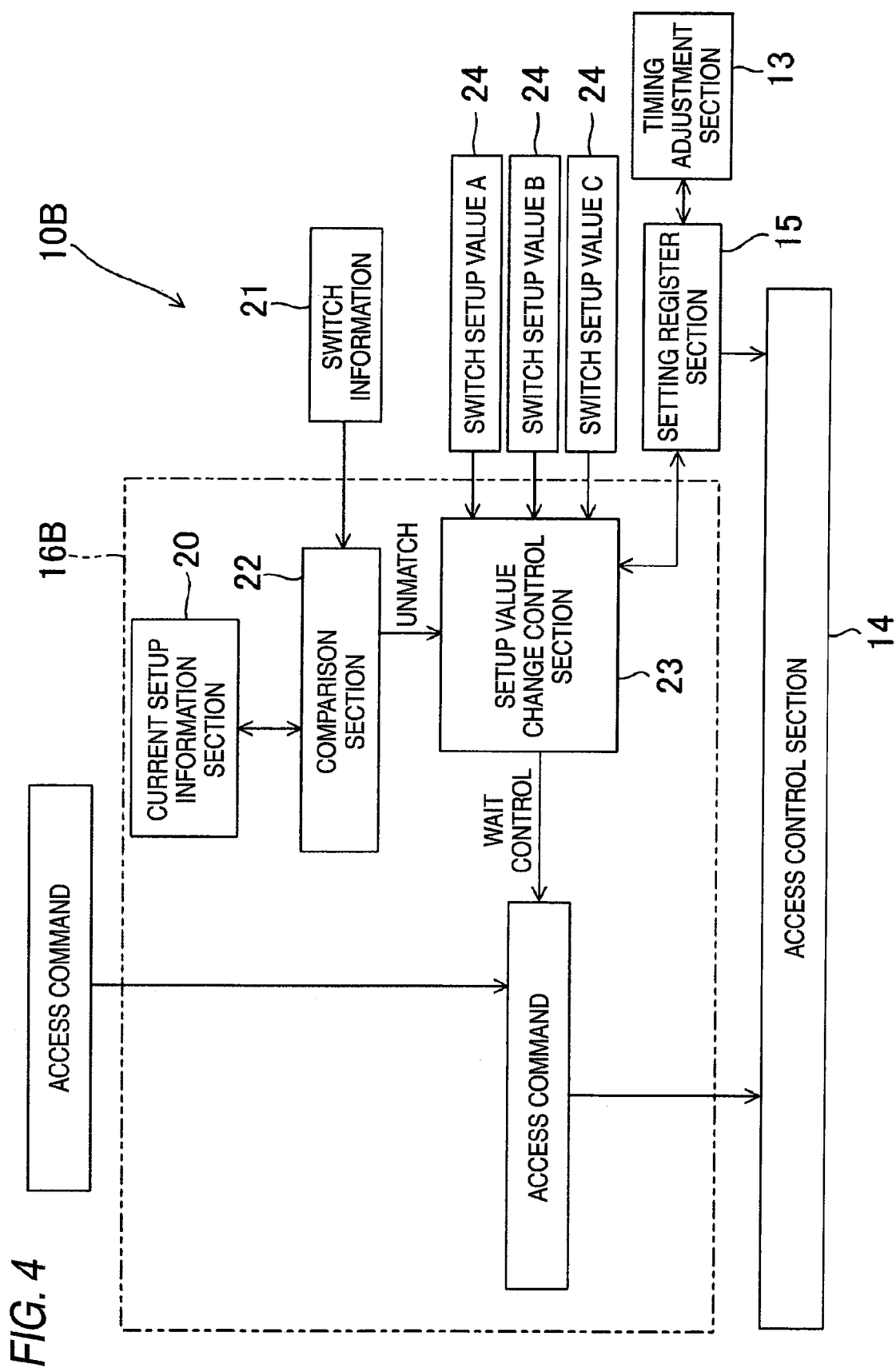
FIG. 4 is a block diagram to show the schematic configuration of a switch control section of a memory control unit according to embodiment 2 of the invention.
Figure 5:
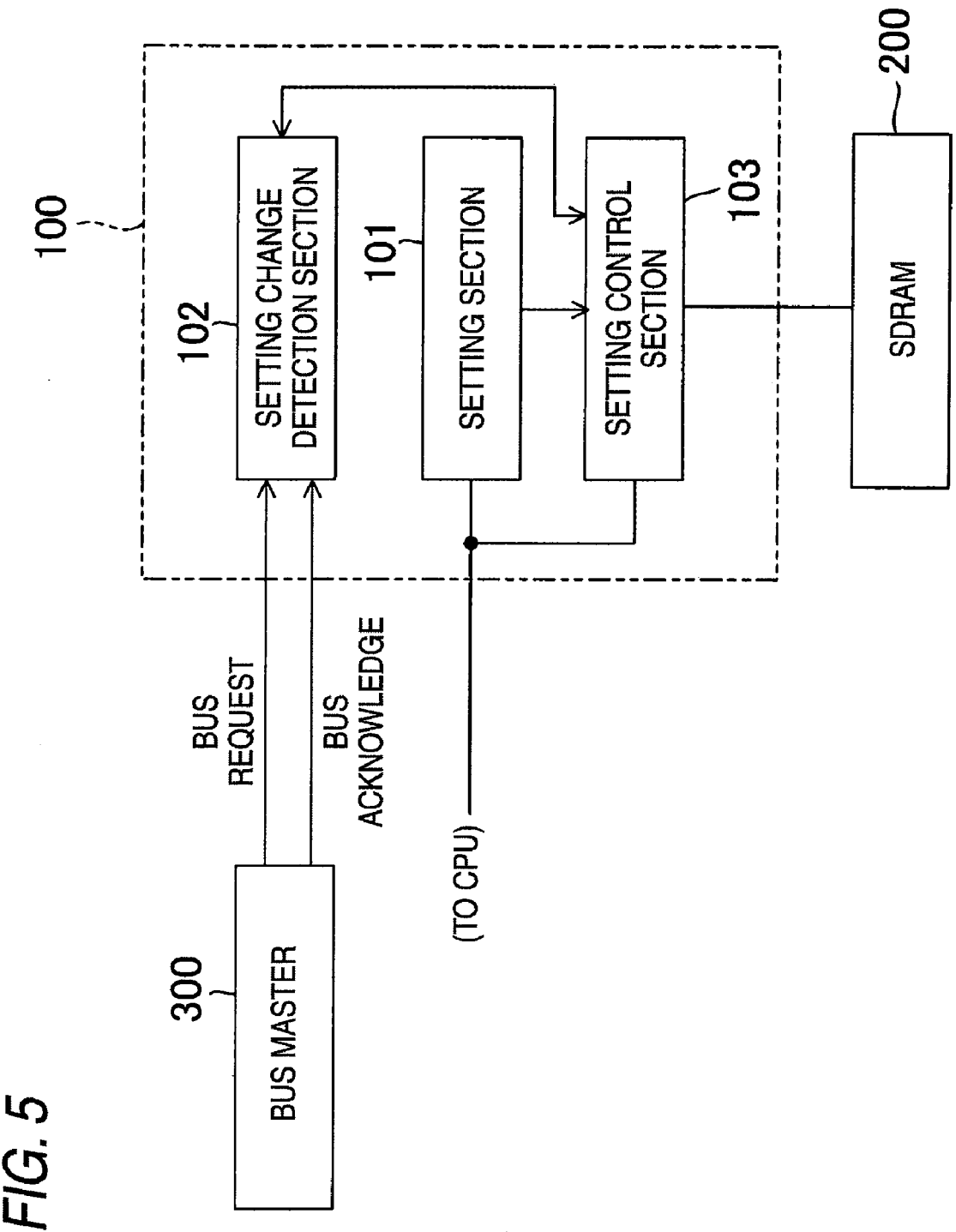
FIG. 5 is a block diagram to show the schematic configuration of a memory control unit in a related art.

FIG. 4 is a block diagram to show the schematic configuration of a switch control section of a memory control unit according to embodiment 2 of the invention. In the figure, a switch control section 16B of a memory control unit 10B of the embodiment includes a current setup information section 20 for retaining setup information indicating the current setup value, a comparison section 22 for making a comparison between switch information 21 and the setup information retained in the current setup information section 20, and a setup value change control section 23 for controlling so as to change the setup value if the switch information 21 does not match the setup information retained in the current setup information section 20 in the comparison of the comparison section 22. The memory control unit 10B of the embodiment has a plurality of switch setup values 24 to cover every state of SDRAM 200.

The switch information 21 input to the comparison section 22 is information to specify a setup value and is input to the comparison section 22 according to a switch signal. As the switch information 21 is input, the comparison section 22 makes a comparison between the setup value specified by the switch information 21 and the current setup value retained in the current setup information section 20. If the specified setup value and the current setup value do not match, the comparison section 22 sends a setup value change request and the switch information 21 to the setup value change control section 23. Upon reception of the setup value change request and the switch information 21 from the comparison section 22, the setup value change control section 23 selects one of the plurality of switch setup values 24 in accordance with the change request and changes the contents of a setting register section 15. As the processing is performed, the setup value can be changed without intentionally stopping access to the SDRAM 200.

The operation of the memory control unit 10B described above will be discussed. First, upon reception of a setup value change request and the switch information 21 from the comparison section 22, the setup value change control section 23 performs wait control and places notification to be sent to an access control section 14 in a wait state. It selects the switch setup value 24 specified by the switch information 21 among the plurality of switch setup values 24 in accordance with the change request from the comparison section 22 and changes the contents of the setting register section 15. Next, when the contents of the setting register section 15 are changed, the wait control is stopped.

Thus, the memory control unit 10B according to the embodiment has a plurality of switch setup values 24 to change the operation setting of the SDRAM 200 and as the switch information 21 is given, selects the switch setup value 24 corresponding to the switch information 21 by the setup value change control section 23 and changes the contents of the setting register section 15, so that the setup values can be easily switched.

While the invention has been described in detail with reference to the specific embodiments, it will be obvious to those skilled in the art that various changes and modifications can be made without departing from the spirit and the scope of the invention.

<Industrial Applicability>

The invention has the advantages that when the operation setting of the SDRAM is changed, the operation setting of the SDRAM can be changed without intentionally stopping access to the SDRAM and it is made possible to change the operation setting of the SDRAM without being affected by the access situation to the SDRAM, and the invention can be applied to a memory control unit for controlling SDRAM, etc.

The invention claimed is:

1. A memory control unit, comprising:
a switch control section, which performs control to switch operation setting of SDRAM;
a switch signal generation section, which generates a switch signal to be supplied to the switch control section;
an access control section, which accepts an access request to the SDRAM from outside; and
a storing section configured to store one or more access commands relating to one or more accepted access requests,
wherein when the access control section receives the switch signal from the switch signal generation section while one or more access commands are stored in the storing section, the access control section executes one of the access commands stored in the storing section and refuses to accept a new access request, until after the operation setting of SDRAM is switched.

2. The memory control unit as claimed in claim 1, comprising a plurality of switch setup values;
wherein the switch control section selects one of the plurality of switch setup values in accordance with switch information to specify the switch setup value, and switches the operation setting of the SDRAM using the selected switch setup value.

3. The memory control unit according to claim 1, wherein the access control section is further configured to, in case the access control section receives the switch signal from the switch signal generation section while one or more access commands are stored in the storing section, continue to execute a command which is being executed when the switch signal is received and stop execution of one or more other commands stored in the cache section until the operation setting of SDRAM is switched.

4. A memory control-method, comprising:
an acceptance step of accepting an access request to SDRAM;
a storing step of storing one or more access commands relating to one or more accepted access request;
a signal generation step of generating a switch signal to execute switch processing of operation setting of the SDRAM; and
a refusing step of, when the switch signal is received while one or more access commands are stored, executing one of the access commands that has been stored and refusing a new access request until after the operation setting of the SDRAM is switched.

* * * * *